United States Patent
Sato et al.

(10) Patent No.: US 9,423,615 B2
(45) Date of Patent: Aug. 23, 2016

(54) HEAD-UP DISPLAY DEVICE

(71) Applicant: NIPPON SEIKI CO., LTD., Niigata (JP)

(72) Inventors: Genichiro Sato, Niigata (JP); Hiroyuki Furusawa, Niigata (JP); Masao Itagaki, Niigata (JP); Takuya Sekiguchi, Niigata (JP)

(73) Assignee: Nippon Seiko Co., Ltd., Niigata (JP)

( * ) Notice: Subject to any disclaimer, the term of this patent is extended or adjusted under 35 U.S.C. 154(b) by 50 days.

(21) Appl. No.: 14/396,679

(22) PCT Filed: Apr. 5, 2013

(86) PCT No.: PCT/JP2013/060436
§ 371 (c)(1),
(2) Date: Oct. 23, 2014

(87) PCT Pub. No.: WO2013/161541
PCT Pub. Date: Oct. 31, 2013

(65) Prior Publication Data
US 2015/0098029 A1    Apr. 9, 2015

(30) Foreign Application Priority Data
Apr. 24, 2012    (JP) ................................ 2012-098594

(51) Int. Cl.
*G02F 1/1335*    (2006.01)
*G01J 1/42*    (2006.01)
(Continued)

(52) U.S. Cl.
CPC ............... *G02B 27/0101* (2013.01); *G01J 1/42* (2013.01); *G02B 27/01* (2013.01);
(Continued)

(58) Field of Classification Search
CPC ... G01J 1/42; G02B 27/0101; G02F 1/13306; G02F 1/1335

USPC .......................................................... 349/11
See application file for complete search history.

(56) References Cited

U.S. PATENT DOCUMENTS

| 6,563,255 B1* | 5/2003 | Collins ................. | H01J 61/523 313/110 |
| 2001/0040534 A1* | 11/2001 | Ohkawara ................ | G09G 5/00 345/7 |
| 2012/0091550 A1* | 4/2012 | Morgan ..................... | G01J 3/26 257/432 |

FOREIGN PATENT DOCUMENTS

JP    06-008748 A    1/1994
JP    2001-315547 A    11/2001
(Continued)

OTHER PUBLICATIONS

Japanese Examination Report issued in Japanese Application No. 2012-098594 dated Sep. 3, 2015.
International Search Report issued in International Application No. PCT/JP2013/060436 mailed May 28, 2013, with English translation.

*Primary Examiner* — Lucy Chien
(74) *Attorney, Agent, or Firm* — McDermott Will & Emery LLP (57) ABSTRACT

Provided is a head-up display (HUD) device capable of effectively preventing damage to a liquid-crystal display device due to entry of exterior light. A HUD device has a liquid-crystal panel, and is provided with a liquid-crystal display device for realizing a transparent display using light from a backlight, a control means for controlling the liquid-crystal display device, and an optical system for reflecting the display light outputted by the liquid-crystal display device onto a windshield. A flat mirror constituting the optical system allows infrared rays of incident light to pass behind the mirror and reflects the visible light. The HUD device is provided with an infrared-ray sensor positioned behind the flat mirror, and the control means reduces the brightness of the light of the backlight or extinguishes the backlight when the strength detected by the infrared-ray sensor exceeds a predetermined threshold.

2 Claims, 5 Drawing Sheets

(51) Int. Cl.
*G02B 27/01* (2006.01)
*G09G 3/34* (2006.01)
*G02F 1/133* (2006.01)
*G02B 5/28* (2006.01)

(52) U.S. Cl.
CPC ..... *G02F 1/13306* (2013.01); *G02F 1/133528* (2013.01); *G02F 1/133555* (2013.01); *G02F 1/133603* (2013.01); *G09G 3/3406* (2013.01); *G02B 5/281* (2013.01); *G02B 2027/0112* (2013.01); *G02B 2027/0118* (2013.01); *G09G 2360/144* (2013.01)

(56) References Cited

FOREIGN PATENT DOCUMENTS

| | | |
|---|---|---|
| JP | 2003-237465 A | 8/2003 |
| JP | 2005-122072 A | 5/2005 |
| JP | 2007-065011 A | 3/2007 |
| JP | 2010-078690 A | 4/2010 |
| JP | 2010-117613 A | 5/2010 |
| JP | 2012-003092 A | 1/2012 |
| WO | 2007-034593 A1 | 3/2007 |

* cited by examiner

HEAD-UP DISPLAY DEVICE

RELATED APPLICATIONS

This application is the U.S. National Phase under 35 U.S.C. §371 of International Application No. PCT/JP2013/060436, filed on Apr. 5, 2013, which in turn claims the benefit of Japanese Application No. 2012-098594, filed on Apr. 24, 2012, the disclosures of which are incorporated by reference herein.

TECHNICAL FIELD

The present invention relates to a head-up display device.

BACKGROUND ART

Conventionally, a head-up display device has been developed to display an image of vehicle information to a front glass of the vehicle so that a driver can read the information without moving his/her eye sight from its direction side. The head-up display device for a vehicle radiates a display light to the windshield and makes the driver to visually recognize a virtual image obtained by the radiation.

Due to entering of the radiation to the display especially in the head-up display device, the liquid crystal of the liquid crystal display device becomes unable to display an image due to liquefaction of liquid crystal, and breaking of the liquid crystal display device may occur because of melting of polarizing plate.

A head-up display device disclosed in Patent Literature 1 has been known. On the front side of the display of the head-up display device, a polarizing member and transparently reflection member that are not parallel to the display surface are provided to prevent it from breaking down by decreasing the amount of the sun light.

CITATION LIST

Patent Literature
Patent Literature 1: Japanese Examined Patent Publication No. 4788882

SUMMARY OF INVENTION

Technical Problem

Under condition that summer sun is located on the extension of the display optical path, and the vehicle stops in that state for a few minutes, the temperature of the display device is increased excessively by external light enters in many devices, not preventable damage to the display is also envisaged.

An object of the present invention is to provide a head-up display device capable of preventing the liquid crystal display device from breaking occurred by the reflection of external sun light.

Solution to Problem

The first feature of the present invention is that a head-up display device comprising: a liquid crystal display device configured to have a liquid crystal panel and a backlight to illuminate the liquid crystal panel from its back side, and to illuminate transparent display illuminated by the backlight; a control means configured to drive control the liquid crystal display device; and an optical system configured to reflect a display light that emitted from the liquid crystal display device while the liquid crystal display device transparently display an image at least one time toward a transparent member; wherein the optical system consists of at least one reflecting member and the reflecting member is a transparently reflecting member which a certain wavelength of light passes though and reflects light except the certain wavelength of light, and the head-up display device further comprising an detecting member, placed behind of the transparently reflecting member, for detecting an intensity of light upon receiving the certain wavelength of light which is transmitted in reverse direction of a pathway of the display light between the liquid crystal display device and the transparent member, and the certain wavelength of light passes through the transparently reflecting member and, the control means controls the backlight to decrease the brightness of the backlight or turn off the backlight upon the intensity detected by the detection means overcomes the predetermined threshold.

The second feature of the present invention is that the head-up display device further comprising the control means controls the backlight to decrease the brightness of the backlight or turn off the backlight after displaying information which indicates the head-up display device may have a malfunction upon the intensity detected by the detection means overcomes the predetermined threshold.

The third feature of the present invention is that the head-up display device comprising the transparently reflecting member that is a cold mirror which transmits an infrared radiation and reflects a visible light, and the detection means is an infrared radiation sensor which detects intensity of the infrared radiation.

Advantageous Effects of Invention

As described above, according to the present invention, it is possible to achieve and provide a head-up display device capable of preventing the liquid crystal display device from breaking occurred by decreasing the amount of sun light.

BRIEF DESCRIPTION OF DRAWINGS

FIG. 2 (a) is an image of structural summery view of a main part of a head-up display device according to the first embodiment of the present invention. FIG. 2 (b) is an image of sectional view of a liquid crystal display device of the head-up display device.

DESCRIPTION OF EMBODIMENTS

With reference to attached drawings, the first embodiment of the invention will be described below with an example of a head-up display device.

Figure 1:
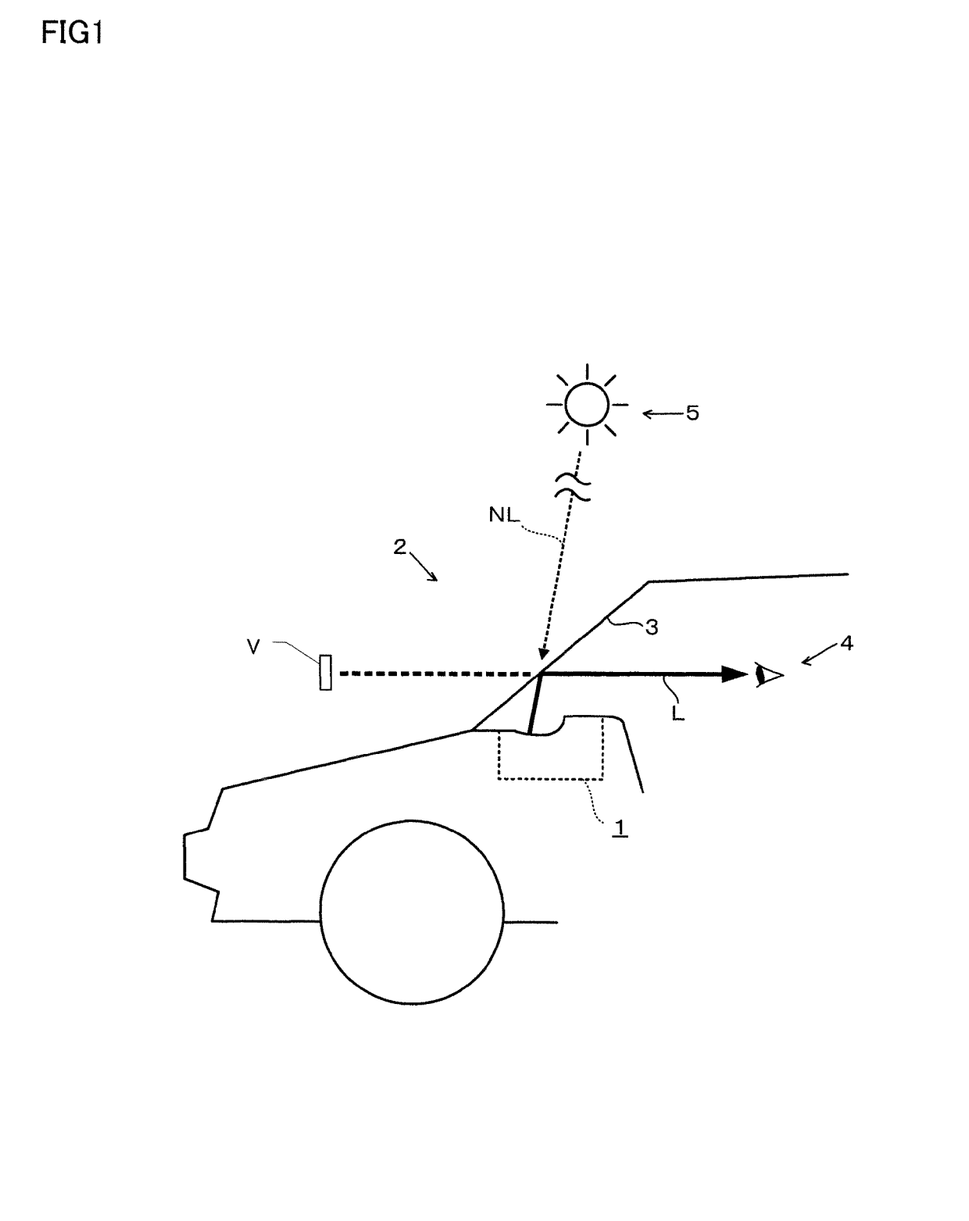
FIG. 1 is a concept image of a head-up display device according to a first embodiment of the present invention describing formation of an image.

As shown in FIG. 1, a first embodiment of the head-up display device is situated in a dashboard of a vehicle and reflects an output light to a windshield 3 (a front glass) to display a virtual image V of a vehicle information and the virtual image V is then visually recognized by a driver. The driver can read the information without moving his/her eye sight from its direction side.

The head-up display device 1 comprises a liquid crystal display device 10, an optical system 20, a detection portion 30, a circuit board 40 including a control unit 41 and a housing 50.

The liquid crystal display device 10 radiates a natural light L to display an image to notify vehicle information. The liquid crystal display device 10 consists of a well known transparent type liquid crystal display device and including a liquid crystal panel 11 and a backlight 12.

The liquid crystal panel 11 comprises a pair of transparent panels 11a, 11b, transistors (ex. Indium Tin Oxide) 11c, 11d formed on inside surfaces of the faced transparent panels 11a, 11b, oriented films to cover the transistors 11c, 11d, liquid crystal layers 11e enclosed in spaces formed by the transparent panels 11a and sealing materials, and a pair of polarizing plates 11f, 11g placed to hold the side of the transparent panels 11a, 11b.

A double refraction of liquid crystal molecules of the liquid crystal layers 11e changes when a power is supplied to the liquid crystal layer 11e through the transparent electrodes 11c, 11d. The display image is transparently displayed with the backlight 12.

The liquid crystal display panel 11 comprises well known liquid crystal panel such as twisted nematic type, vertical alignment type, super-twisted nematic type and ferroelectrics type. The liquid crystal display panel 11 can be TFT (Thin Film Transistor) type, passive drive type, segment display type, or dot matrix type. The polarizing plates 11f, 11g are arranged so that transmission axis to be orthogonal or parallel to each other (crossed nicols prism or paralleled nicols prism).

The backlight 12 comprises more than one LED (Light Emitting Diode) and is placed behind the liquid crystal panel 11 to illuminate the liquid crystal panel 11. The liquid crystal display device 10 transparently displays a virtual image V. A light representing a display image is emitted as a display light L.

A diffuser may be placed between the liquid crystal panel 11 and the backlight 12. The diffuser diffuses the light of the backlight 12 to the liquid crystal panel 11. The diffuser consists of sheet-like member having a plurality of micro lenses arranged at random.

The optic system 20 is placed between light path of the liquid crystal display device 10 and the windshield 3 so that certain size of the virtual image V of the liquid crystal display device 10 appears at a desired area. The optic system 20 described in this embodiment consists two reflecting members of a plane mirror 21 and a concave mirror 22.

The plane mirror 21 is placed at the position the natural light L can reach, and comprises a reflecting surface 21a to reflect the display light L to the concave mirror 22. The plane mirror 21 is a cold mirror made of an aluminum deposited resin molded product and configured a reflecting surface. The reflecting surface 21a is formed of optical thin layers (by a method such as vapor deposition of Al, SiO2, and TiO2).

The concave mirror 22 reflects the display light L reflected by the plane mirror 21 at the concave surface, and emits the reflected light to the windshield 3. The size of the virtual image V is same as the size of the magnified displayed image. The concave mirror 22 can be a cold mirror that reflect visible light and permeate through infrared light. The reflecting surface 21a is formed of optical thin layers (by a method such as vapor deposition of Al, SiO2, and TiO2).

Figure 2:
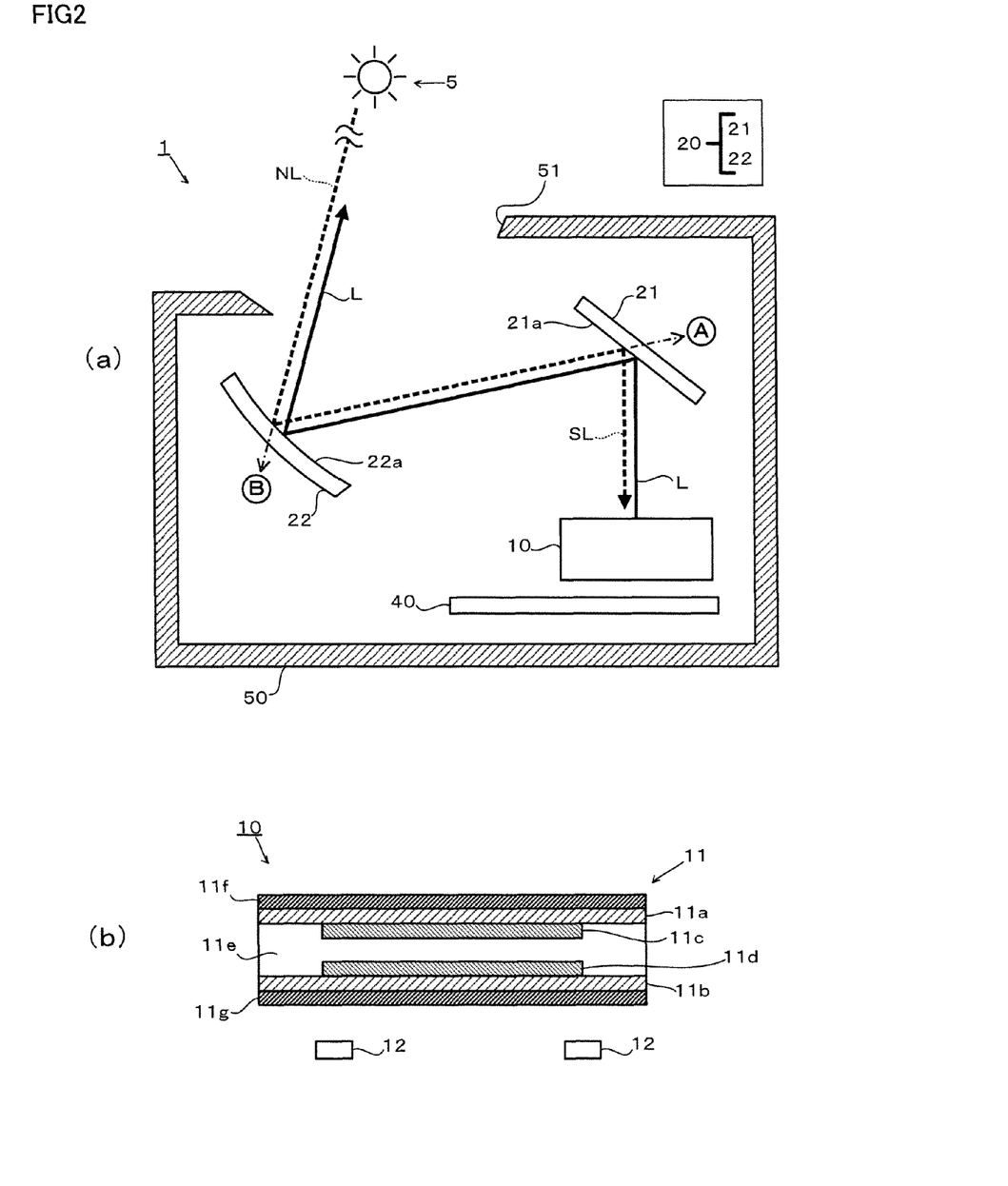
Figure 3:
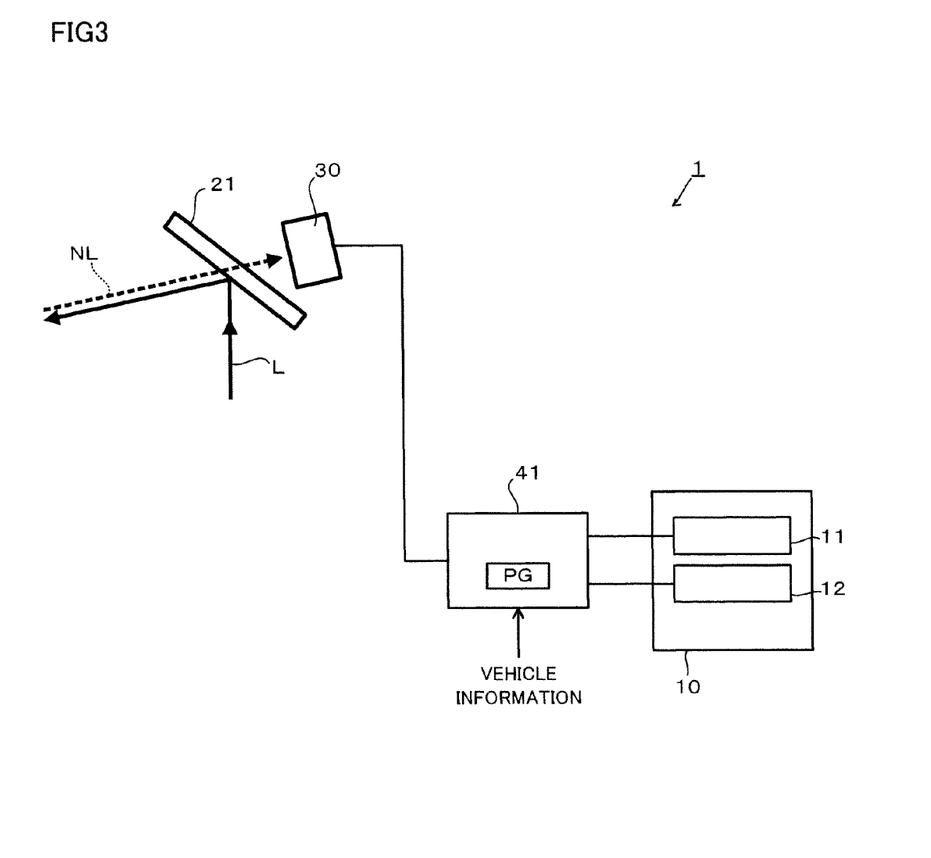
FIG. 3 is an image of a detection unit and a block diagram showing an electrical configuration of a head-up display device according to the first embodiment of the present invention.

The detection unit 30 is placed to detect natural light NL that reaches the liquid crystal display device 10 and effects increasing of temperature of the liquid crystal display device 10. The detection unit 30, as described in FIG. 3, is placed behind of the plane mirror and is an infrared radiation sensor. The detection unit 30 is placed in the pathway of the infrared radiation and detects the infrared radiation. The detection unit 30 supplies a detected signal for strength of infrared radiation light to the control unit 41. As described in FIG. 2, the detection unit 30 is placed at the Unit A.

In this embodiment, the detecting member 30 is placed in reverse direction of a pathway of the display light between the liquid crystal display device 10 and the windshield 3, and the natural light NL that causes an increase in the temperature of the liquid crystal display device 10 can be detected in high accuracy.

A method to detect a increase in the temperature of the center of the display of the liquid crystal display device 10 (in other words, the center of the display of the liquid crystal panel 11), for example, such as placing detecting sensors surrounding the liquid crystal display device is known. However, the sensors might detect an increase in the temperature for uncertain factors, and mislead a false result that indicates the temperature is over a threshold of causing a breakage in the liquid crystal display device. In order to achieve a result that reflects the real temperature of the center of the liquid crystal display device 10, the temperature sensors may be placed on top of the display, however, it is difficult to place the sensors without disturbing the display image. According to this embodiment, the HEAD-UP DISPLAY device is capable of detecting temperature of the display without interfere the display.

In FIG. 2 (a), only the direction of where the detection unit 30 is shown to describe the structure. A unit B shown in this figure describes the position of the detection unit in second embodiment.

The circuit board 40 is formed of glass reinforced plastics with copper tracks in the place of wires. The circuit board 40 is placed at the opposite side of the light emission side of the liquid crystal display device 10. The backlight 12 and the control unit 41 are assayed and electrically connected to the liquid crystal display device 10 and detection unit 30 through flexible printed circuit.

The control unit 41 is comprised of microcomputer including memory means of CPU (Central Processing Unit) ROM (Read Only Memory) and RAM (Random Access Memory), and timer device. A program for executing the display control processing is stored the ROM of the control unit 41 in advance and the CPU reads out the memory.

The circuit board 40 is assayed with drive circuit to drive an amplification circuit and the liquid crystal display device 10. The control unit 41 acquires vehicle information sent by a communications network from a vehicle ECU (Electronic Control Unit) and drive the liquid crystal display device 10 according to the vehicle information. The drive unit 41 applies voltage to the liquid crystal panel 11 and illuminates the backlight 12.

The detection unit 30 is for detecting brightness of light reached. The detection unit 30 supplies the amplifier circuit with a detection signal representing the brightness of light reached. The amplifier circuit amplifies the detection signal detected by the detection unit 30, and supplies it to the control unit 41. The control unit 41 adjusts the brightness of the display image displayed by the liquid crystal display device 10 via the drive circuit based on the obtained detection signal. For example, when a value indicating the brightness of the light received by the optical sensor 31 is higher than a threshold value (previously stored), a temperature of the center of the liquid crystal panel 11 is assumed to be high, the brightness of the backlight light source is decreased or the liquid crystal display device 10 is turned off.

The housing 50 is a box formed of a hard resin with an opening at upper side and comprising of the liquid crystal display device 10, the optical system 20, the detection unit 30, and the circuit board 40. The opening of the housing 50 is to ensure a pathway to display light L or display light L reflected at a concave mirror reaches a windshield 3 passing though the opening 51. A clear window panel might be required to cover the opening of the housing 50.

The head-up display device 1 described above allows a driver to recognize a certain display image as a virtual image V. A mechanism includes:
(i) The liquid crystal display device 10 is under control of the control unit 41 to emit a display light L.
(ii) The display light L is reflected at the optical system 20 (the plane mirror 21 and the concave mirror 22) and reflected light is emitted to the windshield 3.
(iii) The display light L emitted by the head-up display device 1 also reflected at the windshield 3. As shown at FIG. 1, the visual image V is formed in front of the windshield 3.

Upon the sun rises on top of the head-up display device 1, the natural light NL passes from the liquid crystal display device 10 to the windshield 3 in a direction opposite to that of display light L, the temperature of the display increases too high that it may cause a breakage to the liquid crystal display device 10. The head-up display device 1 prevents the liquid crystal display device 10 from breaking due to an increasing in the temperature by acting display controlling processing.

(Display Controlling Processing)

Figure 4:
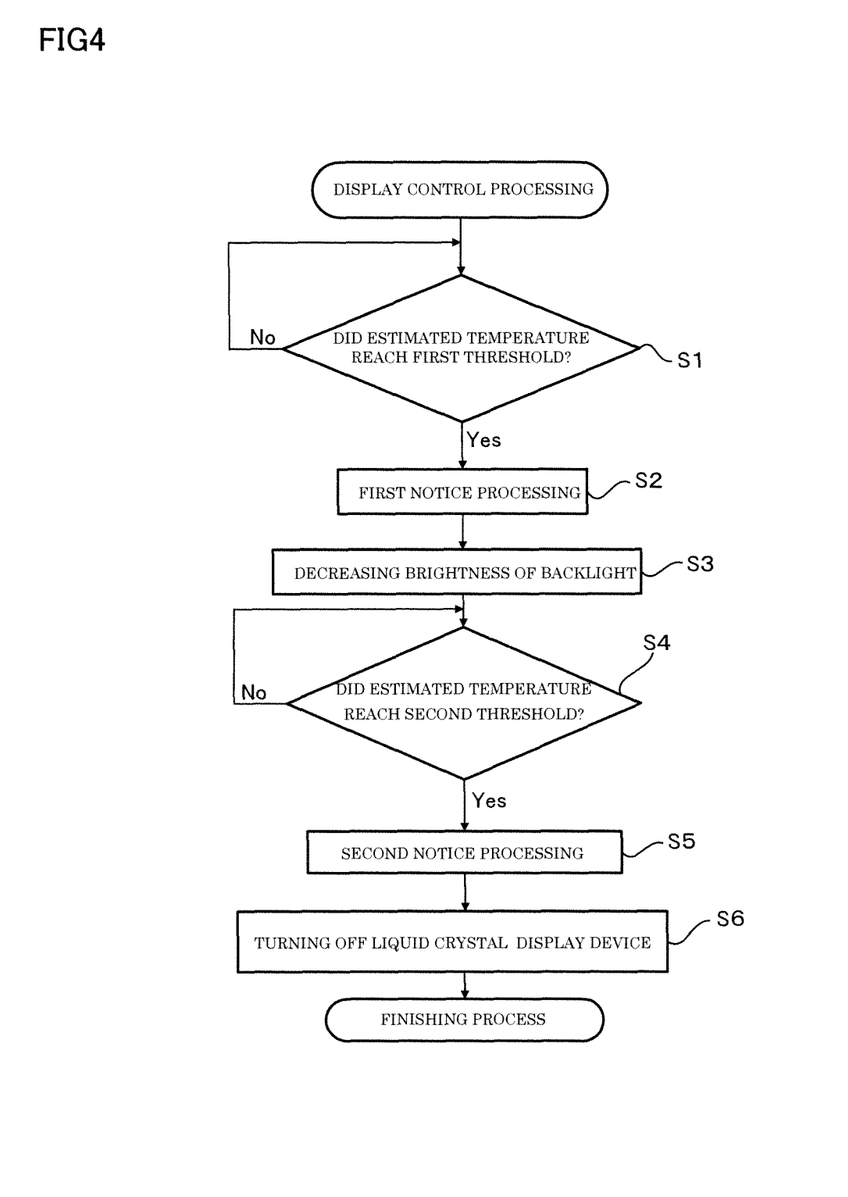
FIG. 4 is a flow chart showing a display control processing.

The control unit 41 starts display controlling processing upon power supply to the head-up display device 1.

The control unit 41 determines whether the estimated amount based on the detection signal from the detection unit 30 reached the first threshold stored in advance (step S1).

The estimated amount refers to an estimable temperature of the center of the liquid crystal display device 10 or an actual temperature of the center of the liquid crystal display device 10. The estimable temperature of the center of the liquid crystal display device 10 is, for example, integrated temperature that indicated by the detection signal or an average temperature dividing the integrated temperature with present time. The estimated temperature of the center of the liquid crystal display device 10 is obtained by a programming that was derived by an expression representing the relationship between the detection signal and the temperatures of the central liquid crystal display device 10 in advance, and a table is stored in the storage means in advance and the amount of change in the temperature of the center of the liquid crystal display device 10 and the temperature that was calculated by the control unit 41. The control unit 41 obtains the estimated temperature by referring the table. Detection value is a value that is obtained based on the value detection signal obtained from the detector is indicated.

Using the estimated temperature indirectly indicates an increase in the temperature of the liquid crystal display device 10. The first threshold is set to the temperature that the liquid crystal display device 10 may have a trouble displaying. The estimated temperature is set to the inside temperature of the vehicle 2 or the housing 50 of the head-up display device 1 as considerable temperature. An atmosphere temperature is also set as an estimated temperature of the inside temperature of the vehicle during operating the vehicle or, for example, a temperature detected by a temperature sensor stored inside of the vehicle.

When the estimated temperature dose not reach the first threshold (step S1: No), the control unit 41 repeats the action of step S1. When the estimated temperature reaches the first threshold (step S1: Yes), the control unit 41 runs a first notice processing to notify the driver that the liquid crystal display device 10 might be damaged (step S2). For more detail explanation, in the first notice processing, the control unit 41 outputs an image date to display a message such as "head-up display device at high temperature, switched to low brightness mode" and displays the image. The driver recognizes the image of the message. A car navigation system might be used to display such a message or an audio system might be used to report a message instead of displaying as a visual image.

The control unit 41 then decreases a brightness of the backlight 12 (step S3). As decreasing the brightness of the backlight 12 can prevent an increasing in the temperature of the liquid crystal panel 11.

The control unit 41 determines whether the estimated temperature reaches the pre-memorized second threshold (step S4). The second threshold is set to temperature higher than the first threshold that causes damage to the liquid crystal display device 10. When the estimated temperature dose not reach the pre-memorized second threshold (step S4: No), the control unit 41 repeats the action of step S4. If the estimated temperature reaches the pre-memorized second threshold (step S4: Yes), the control unit 41 runs a second notice processing to notify the driver that the liquid crystal display device 10 is turning off (step S5).

For more detail explanation, in the second notice processing, the control unit 41 outputs an image date to display a message such as "head-up display device at high temperature, turning off the display" and displays the image. The driver recognizes the image of the message. A car navigation system might be used to display such a message or an audio system might be used to report a message instead of displaying as a visual image.

The control unit 41 then stops the liquid crystal panel 11 and turning off the backlight 12, ending the display control processing (step S6).

Additionally, the control unit 41 can output an image date to display a message such as "head-up display device at normal temperature, switching to normal mode" and displays the image. The driver recognizes the image of the message. A car navigation system might be used to display such a message or an audio system might be used to report a message instead of displaying as a visual image.

Figure 5:
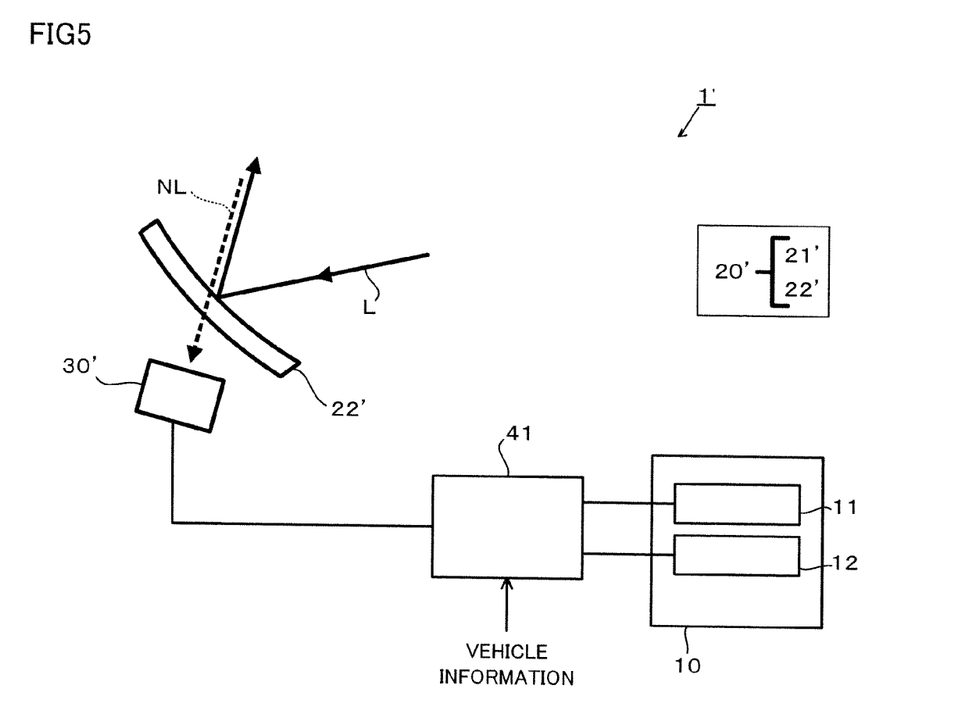
FIG. 5 is an image of a detection unit and a block diagram showing an electrical configuration of a head-up display device according to a second embodiment of the present invention.

In the second embodiment, the detection unit for detecting strength of infrared radiation is placed at behind of the concave mirror. Parts having similar functions as those of the embodiment will be denoted by the same reference numerals and description overlapping with the embodiment will be omitted.

The head-up display device 1' of the second embodiment comprises the detection unit and optical system that are different from the first embodiment in position of the detection unit and composition of the optical system.

The head-up display device comprises a liquid crystal display device 10, an optical system 20', a detection portion 30', a circuit board 40 and a housing 50. The optical system 20' of the second embodiment, as described in FIG. 5, comprises two reflecting members of a plane mirror 21' and a concave mirror 22'.

The plane mirror 21 is placed at the position the natural light L can reach, and comprises a reflecting surface 21a to reflect the natural light L to the concave mirror 22'. The plane mirror 21' is made of optical thin layers such as aluminum deposited resin molded product and configured a reflecting surface.

The concave mirror 22' reflects the display light L reflected by the plane mirror 21' at the concave surface, and emits the reflected light to the windshield 3. The size of the virtual image V is same as magnified displayed image. The concave mirror 22' can be a cold mirror that reflect visible light and permeate through infrared light. The reflecting surface 21*a* is formed of optical thin layers (by a method such as vapor deposition of Al, SiO2, and TiO2). In the second embodiment, the transparently reflecting member consists of the concave mirror 22'.

The detecting unit 30' has the same function as the detection unit 30 of the first embodiment, but the position is different from the first embodiment. The detection unit 30', as described in FIG. 5, is positioned behind of the concave mirror 22' and is an infrared radiation sensor. The detection unit 30' sends a detection signal that indicates the strength of the infrared radiation to the control unit 41.

The head-up display device 1' also runs the display control processing same as the first embodiment. According to this embodiment, the head-up display device is capable of detecting temperature of the display without interfere the display of the liquid crystal display device 10.

According to the head-up display devices 1, 1' described above, these devices are able to prevent the liquid crystal display device from breaking by decreasing the amount of sun light by following construction.

According to the first embodiment, A head-up display device 1 comprising: a liquid crystal display device 10 configured to have a liquid crystal panel 11 and a backlight 12 to illuminate the liquid crystal panel 11 from its back side, and to illuminate transparent display illuminated by the backlight 12;

a control unit 41 (a control means) configured to drive control the liquid crystal display device 10; and an optical system 20 configured to reflect a display light L that emitted from the liquid crystal display device 10 while the liquid crystal display device 10 transparently display an image at least one time toward a windshield 3 (a transparent member); wherein the optical system 20 consists of a plane mirror 21 and a concave mirror 22 (at least one reflecting member) and the plane mirror 21 is a cold mirror (a transparently reflecting member) which a certain wavelength of light passes though and reflects the light except the certain wavelength of light, an detecting unit 30 (an detecting member), placed behind of the transparently reflecting member, for detecting an intensity of light upon receiving the certain wavelength of light which is transmitted in reverse direction of a pathway of the display light L between the liquid crystal display device 10 and the windshield 3, and the certain wavelength of light passes through the plane mirror 21 and, the control unit 41 controls the backlight 12 to decrease the brightness of the backlight 12 or turn off the backlight 12 upon the intensity detected by the detection unit 30 overcomes the predetermined threshold.

According to the second embodiment, A head-up display device 1' comprising: a liquid crystal display device 10 configured to have a liquid crystal panel 11 and a backlight 12 to illuminate the liquid crystal panel 11 from its back side, and to illuminate transparent display illuminated by the backlight 12;

a control unit 41 (a control means) configured to drive control the liquid crystal display device 10; and an optical system 20' configured to reflect a display light L that emitted from the liquid crystal display device 10 when the liquid crystal display device 10 transparently display an image at least one time toward a windshield 3 (a transparent member); wherein the optical system 20' consists of a plane mirror 21' and a concave mirror 22' (at least one reflecting member) and the concave mirror 22' is a cold mirror (a transparently reflecting member) which a certain wavelength of light passes though and reflects the light except the certain wavelength of light, an detecting unit 30' (an detecting member), placed behind of the transparently reflecting member, for detecting an intensity of light upon receiving the certain wavelength of light which is transmitted in reverse direction of a pathway of the display light L between the liquid crystal display device 10 and the windshield 3, and the certain wavelength of light passes through the plane mirror 21 and, the control unit 41 controls the backlight 12 to decrease the brightness of the backlight 12 or turn off the backlight 12 upon the intensity detected by the detection unit 30 overcomes the predetermined threshold.

According to the head-up display device 1, 1', the control unit 41 controls the backlight 12 to decrease the brightness of the backlight 12 or turn off the backlight 12 after displaying a information which to indicate the head-up display device 1, 1' may have a malfunction upon the intensity detected by the detection unit 30, 30' overcomes the predetermined threshold.

With these features, the driver can be noticed the situation before decreasing the brightness of the liquid crystal display device 10 or turning off the display.

The reflecting members which comprise the optical system 20, 20' are explained as the concave mirror 22, 22', and the concave shape makes the mirror easy to concentrate the natural light in the center of the liquid crystal display device 10.

In the head-up display device 1, 1', controls the backlight 12 to decrease the brightness of the backlight or turn of the backlight, and able to prevent the liquid crystal display device from breaking by decreasing the amount of sun light by following construction.

This invention is not limited to the embodiment 1 and 2, and different embodiment is explained as following.

The plane mirror or concave mirror are explained as they reflect visible light and penetrate the infrared light, but this invention is not limited to the embodiment 1 and 2. The plane mirror and concave mirror can be dichroic mirror which penetrate a certain wavelength of light and reflect the light of other wavelength. In this case, a light sensor is placed for detecting a strength of transparent light of the certain wavelength, and the control unit process display control based on a signal that sent by the sensor. As long as the strength of the natural light that reaches the liquid crystal display device 10 and a increase in temperature of the liquid crystal display device 10 are detected, The optical system 20 and 20' can be composed of one or two reflecting member, or they also can be three or more reflecting member. The several detecting sensors can be placed behind of the reflecting member as the reflecting member includes transparently reflecting members.

The above description shows an example that the display light L from the display unit is reflected by the reflection part and reached to the combiner, but not limited thereto. The head-up display device may be configured such that the display unit emits the display light L directly to the combiner. In this case, the display unit and combiner are arranged so as to substantially opposite to each other, and the reflection part is unnecessary. The head-up display device is has been explained as a stationary type; however, the head-up display device may be configured integrally with a dashboard of a vehicle.

In the above description, an automobile is taken as an example of vehicles to install the head-up display device, but not to be limited thereto. The head-up display device may be installed in a ship, an airplane, or other vehicles such as agricultural machinery and construction equipment.

The invention is not limited to above description and figures. The embodiment and figures can be changed or deleted as long as the concept of the invention does not change.

REFERENCE SIGNS LIST

1: head-up display device
10: liquid crystal display device
20: optical system
21: plane mirror
22: concave mirror
30: detecting unit
40: circuit board
41: control unit
50: housing
2: vehicle
3: windshield
4: driver
5: sun
L: display light
NL: natural light
V: virtual image

The invention claimed is:

1. A head-up display device comprising:
a liquid crystal display device configured to have a liquid crystal panel and a backlight to illuminate the liquid crystal panel from back side, and to illuminate transparent display illuminated by the backlight;
a control means configured to drive control the liquid crystal display device; and
an optical system configured to reflect a display light that emitted from the liquid crystal display device while the liquid crystal display device transparently display an image at least one time toward a transparent member, wherein
the optical system consists of at least one reflecting member and the reflecting member is a transparently reflecting member which a certain wavelength of light passes through and reflects the light except the certain wavelength of light,
the head-up display device further comprising an detecting member, placed behind of the transparently reflecting member, for detecting an intensity of light upon receiving the certain wavelength of light which is transmitted in reverse direction of a pathway of the display light between the liquid crystal display device and the transparent member, and the certain wavelength of light passes through the transparently reflecting member,
the control means controls the backlight to decrease the brightness of the backlight or turn off the backlight upon the intensity detected by the detection means overcomes the predetermined threshold, and
the transparently reflecting member is a cold mirror which transmits an infrared radiation and reflects a visible light, and the detection means is an infrared radiation sensor which detects intensity of the infrared radiation.

2. A head-up display device comprising:
a liquid crystal display device configured to have a liquid crystal panel and a backlight to illuminate the liquid crystal panel from back side, and to illuminate transparent display illuminated by the backlight;
a control means configured to drive control the liquid crystal display device; and
an optical system configured to reflect a display light that emitted from the liquid crystal display device while the liquid crystal display device transparently display an image at least one time toward a transparent member, wherein
the optical system consists of at least one reflecting member and the reflecting member is a transparently reflecting member which a certain wavelength of light passes through and reflects the light except the certain wavelength of light,
the head-up display device further comprising an detecting member, placed behind of the transparently reflecting member, for detecting an intensity of light upon receiving the certain wavelength of light which is transmitted in reverse direction of a pathway of the display light between the liquid crystal display device and the transparent member, and the certain wavelength of light passes through the transparently reflecting member,
the control means controls the backlight to decrease the brightness of the backlight or turn off the backlight upon the intensity detected by the detection means overcomes the predetermined threshold,
the control means controls the backlight to decrease the brightness of the backlight or turn off the backlight after displaying information which to indicate the head-up display device may have a malfunction upon the intensity detected by the detection means overcomes the predetermined threshold, and
the transparently reflecting member is a cold mirror which transmits an infrared radiation and reflects a visible light, and the detection means is an infrared radiation sensor which detects intensity of the infrared radiation.

* * * * *